US012664101B1

(12) United States Patent
Bareket et al.

(10) Patent No.: US 12,664,101 B1
(45) Date of Patent: Jun. 23, 2026

(54) METHODS AND APPARATUS FOR WORKFLOW PROCESSING

(71) Applicant: Marvell Asia Pte, Ltd., Singapore (SG)

(72) Inventors: Yaron Bareket, Petach Tikva (IL); Adi Katz, Ramat Gan (IL); Ofer Lavi, Ramat Gan (IL)

(73) Assignee: Marvell Asia Pte, Ltd., Singapore (SG)

( * ) Notice: Subject to any disclaimer, the term of this patent is extended or adjusted under 35 U.S.C. 154(b) by 519 days.

(21) Appl. No.: 18/104,225

(22) Filed: Jan. 31, 2023

Related U.S. Application Data

(60) Provisional application No. 63/423,797, filed on Nov. 8, 2022.

(51) Int. Cl.
G06F 12/14 (2006.01)
G06F 12/02 (2006.01)

(52) U.S. Cl.
CPC ...... G06F 12/1408 (2013.01); G06F 12/0292 (2013.01); G06F 12/1441 (2013.01)

(58) Field of Classification Search
CPC ............... G06F 16/137; G06F 12/1408; G06F 12/0292; G06F 12/1441
See application file for complete search history.

(56) References Cited

U.S. PATENT DOCUMENTS 7,844,862 B1 * 11/2010 Grove .................. G06F 11/362
711/163
11,403,273 B1 * 8/2022 Burgmeier .......... G06F 16/2237

11,467,841 B1 * 10/2022 Tran ...................... G06F 9/3822
2006/0179429 A1 * 8/2006 Eggers .................. G06F 9/4494
712/E9.05
2017/0351555 A1 * 12/2017 Coffin .................. G06F 9/5083
2018/0253438 A1 * 9/2018 Zaydman .............. G06F 16/137
2019/0146922 A1 * 5/2019 Avrukin ................ G06F 12/084
711/137
2021/0034571 A1 * 2/2021 Bedadala .............. G06F 16/134

FOREIGN PATENT DOCUMENTS

EP 1150213 A1 * 10/2001 ......... G06F 12/0862

* cited by examiner

*Primary Examiner* — Tarek Chbouki

(74) *Attorney, Agent, or Firm* — JW Law Group; James M. Wu

(57) ABSTRACT

Methods and apparatus for workflow processing are disclosed. In an embodiment, a method includes receiving a workflow queue entry (WQE) that includes a key value and searching a plurality of memory tables for an address that contains the key value. When the address that contains the key value is found, obtaining a first queue identifier from the address. When the address that contains the key value is not found, storing the key value and a second queue identifier at a selected address in a selected memory table. The method also includes storing the WQE in an aggregation queue identified by one of the first and second queue identifiers, updating a count associated with the aggregation queue, and when the count reached a selected level, aggregating all WQE entries in the aggregation queue to form a vector WQE.

21 Claims, 8 Drawing Sheets

METHOD FOR STORING WQE IN AGGREGATION TABLE

WORK FLOW PROCESSOR

SRAM AND AGGREGATION TABLES

METHOD FOR STORING KEYS IN SRAM

METHOD FOR STORING WQE IN AGGREGATION TABLE

METHOD FOR FORMING VWQE OUTPUT FROM
WQE'S IN AN AGGREGATION QUEUE

METHOD FOR SCRUBBING
AGGREGATION TABLE

800

START

802 — SELECT FIRST SRAM TABLE

804 — SELECT FIRST ADDRESS OF SRAM TABLE

806 — ENTRY TOO OLD?

Y → 816 — AGGREGATE WQE IN ASSOCIATED QUEUE AND OUTPUT VWQE

818 — DELETE ENTRY FROM SRAM AND CLEAR TIMESTAMP AND QUEUE IDENTIFIER

N

808 — ALL SRAM ADDRESSES IN TABLE CHECK?

N

810 — SELECT NEXT ADDRESS IN SRAM TABLE

812 — ALL SRAM TABLES CHECKED?

Y → END

N

814 — SELECT NEXT SRAM TABLE

METHOD FOR SCRUBBING SRAM TABLES

METHODS AND APPARATUS FOR WORKFLOW PROCESSING

CROSS-REFERENCE TO RELATED APPLICATIONS

This application claims the benefit of priority under 35 U.S.C 119 (e) to U.S. Provisional Patent Application No. 63/423,797 filed on Nov. 8, 2022 and entitled "Vector Work Queue Entry (VWQE) Search using Cuckoo Hashing Algorithm," which is incorporated by reference herein in its entirety.

FIELD

The exemplary embodiments of the present invention relate to telecommunications networks. More specifically, the exemplary embodiments of the present invention relate to receiving and processing workflows via a wireless communication network.

BACKGROUND

One of the key components of virtually any layer 2 or layer 3 switch is the Ternary Content Addressable Memory (TCAM). TCAM is an expensive component and is typically a scarce resource on many switching platforms. This especially holds true on lower-end platforms where the administrator must make decisions about how to allocate the available TCAM resources to match the role the switch plays in the network.

Unfortunately, TCAM is not the cure all for hardware search lookups since TCAM is expensive, power hungry and takes up quite a bit of silicon space.

SUMMARY

In various exemplary embodiments, methods and apparatus are provided for workflow processing. In an embodiment, work queue entries (WQE) are aggregate utilizing an SRAM memory and hashing algorithm. Each WQEs comprises data and a key value. The key values are hashed to obtain addresses with which to access the SRAM memory. Aggregation queues are also provided to allow WQE's having the same key value to be aggregated to form vectors of WQE's (VWQE).

In an embodiment, a type of hashing referred to "Cuckoo" hashing is utilized. Cuckoo hashing is a form of open addressing in which each non-empty cell of a hash table contains a key or key-value pair. A hash function is used to determine the location for each key, and its presence in the table (or the value associated with it) can be found by examining that cell of the table. However, open addressing suffers from collisions, which happens when more than one key is mapped to the same cell. The basic idea of cuckoo hashing is to resolve collisions by using two hash functions instead of only one. This provides two possible locations in the hash table for each key.

In an embodiment, a method is provided that includes receiving a workflow queue entry (WQE) that includes a key value and searching a plurality of memory tables for an address that contains the key value. When the address that contains the key value is found, obtaining a first queue identifier from the address. When the address that contains the key value is not found, storing the key value and a second queue identifier at a selected address in a selected memory table. The method also includes storing the WQE in an aggregation queue identified by one of the first and second queue identifiers, updating a count associated with the aggregation queue, and when the count reached a selected level, aggregating all WQE entries in the aggregation queue to form a vector WQE.

In another embodiment, an apparatus is provided that includes an interface configured to receive a workflow queue entry (WQE) that includes a key value, a plurality of memory tables, and an aggregation table having one or more aggregation queues. The apparatus also includes a processor configured to perform operations of searching the plurality of memory tables for an address that contains the key value, when the address that contains the key value is found, obtaining a first queue identifier from the address, and when the address that contains the key value is not found, storing the key value and a second queue identifier at a selected address in a selected memory table. The processor is also configured to perform operations of storing the WQE in an aggregation queue identified by one of the first and second queue identifiers, updating a count associated with the aggregation queue, and when the count reached a selected level, aggregating all WQE entries in the aggregation queue to form a WQE vector (VWQE).

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
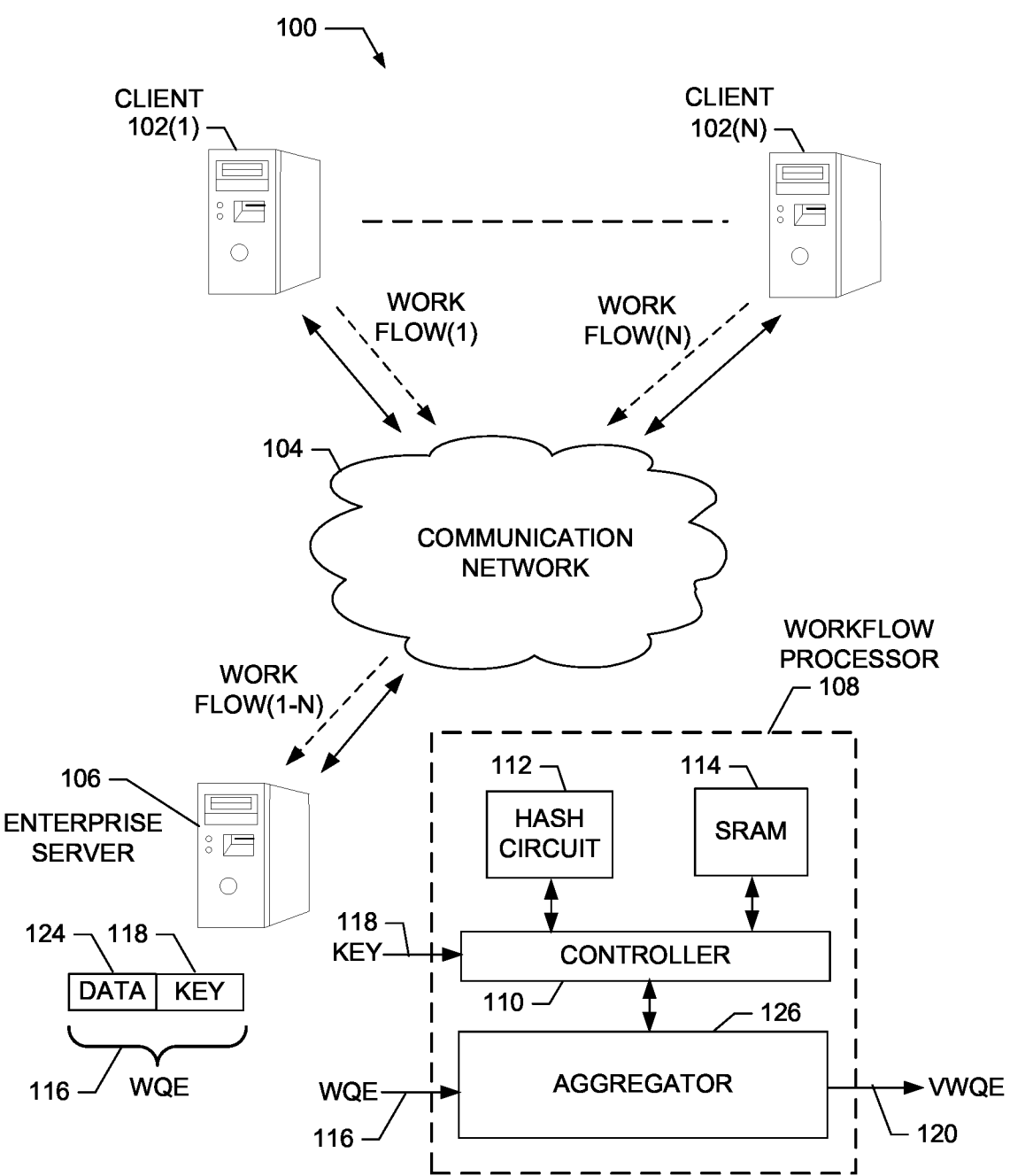
FIG. 1 shows a communication network comprising a server having an embodiment of a workflow processor constructed in accordance with the invention.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a communication network 100 comprising an enterprise server 106 that includes an embodiment of a workflow processor 108. As illustrated in FIG. 1, a plurality of clients 102 (1-N) communicate with the enterprise server 106 through communication network 104. The clients 102 (1-N) transmit workflows (1-N) to the enterprise server 106. In an embodiment, the workflows comprise work queue entries (WQE) 116 that include data 124 and a key 118. During operation, thousands, or millions of WQE's are received at the enterprise server 106.

The workflow processor 108 comprises controller 110, hash circuit 112, SRAM memory 114, and aggregator 126. The controller 110 receives the keys of the WQE's, such as key 118, and processes the received keys to control the aggregator 216 to generate workflow vectors VWQE 120 that comprise a string or stream of WQE's having the same key. The VWQE's 120 are transmitted to downstream processing systems for further processing.

The hash circuit 112 operates to hash the keys to generate address values that are used to access the SRAM 114. For example, in one embodiment, the hashing algorithm comprises a cuckoo hashing algorithm to resolve hash collisions. The keys are then stored in the SRAM at the hashed addresses. The keys are stored with an index to a queue in the aggregator 126. The WQE's are stored in the aggregator in the corresponding queue. Once an aggregator queue is filled, the WQE's within the queue are assembled into a VWQE 120 for output.

Since the workflow processor utilizes SRAM for storage, the result is a smaller and power efficient search engine that is able to process the received WQE's to form the VWQE's 120. Additional descriptions of the workflow processor 108 and its operations are provided below.

Figure 2:
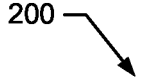
FIG. 2 shows an exemplary embodiment of a workflow processor.
Figure 2:
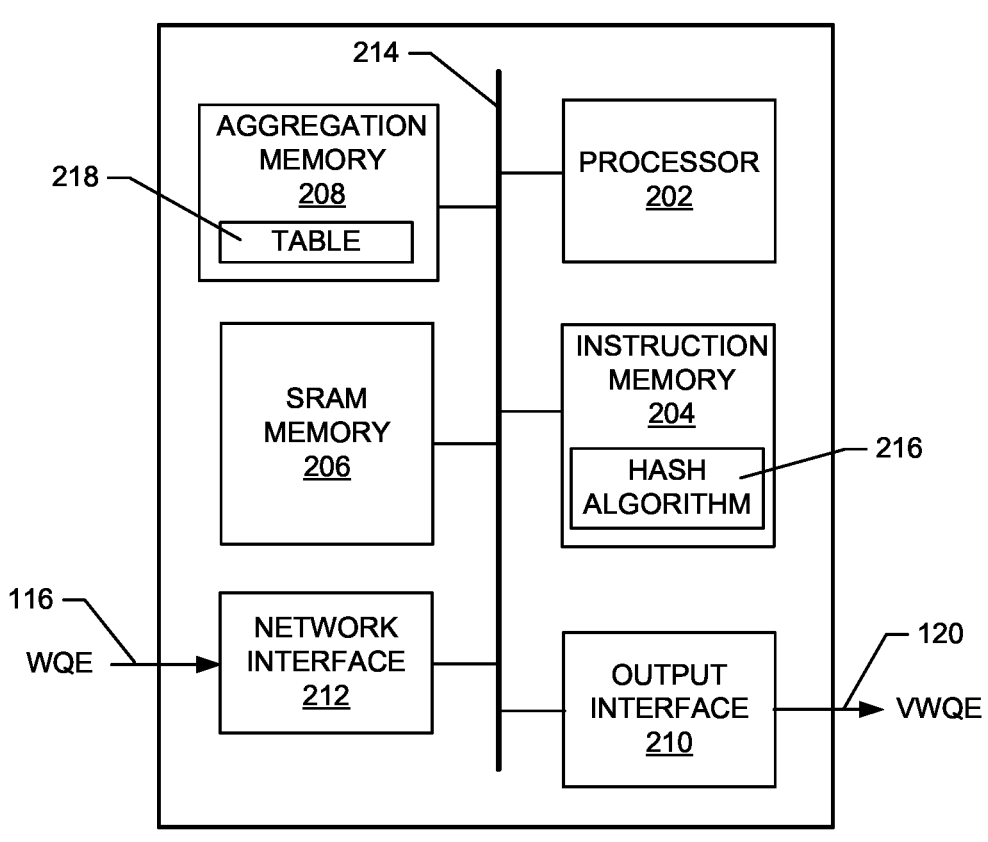

FIG. 2 shows an exemplary embodiment of a workflow processor 200. For example, the workflow processor 200 is suitable for use as the workflow processor 108 shown in FIG. 1. The workflow processor 200 comprises processor 202, instruction memory 204, SRAM memory 206, aggregation memory 208, output interface 210, and network interface 212 all coupled to communicate using bus 214.

The processor 202 comprises at least one of a CPU, processor, state machine, programmable logic, memory, hardware, and/or discrete components configured to perform the functions described herein.

The instruction memory 204 comprises any suitable memory, such as RAM, PROM, or other type of memory. In one embodiment, the memory 204 stores a hash algorithm 216 that can be retrieved by the processor 202 and executed to perform a hash function as described herein.

The SRAM 206 comprises one or more static RAM devices that are used to store received keys along with aggregation queue identifiers, timestamps, and other relevant information.

The aggregation memory 208 comprises any suitable memory, such as RAM, or other type of memory that forms queues to store WQE's 116 that are combined to form the VWQE 120. In one embodiment, the aggregation memory 208 stores an aggregation table 218 of queues of WQE's associated with different keys.

The network interface 212 comprises at least one of a CPU, processor, state machine, programmable logic, memory, hardware, and/or discrete components that perform the functions described herein. The network interface 212 operates to receive WQEs 116 that are received from a communication network, such as the network 104. The WQE's 116 are transmitted by one or more client devices, such as clients 102 (1-N) shown in FIG. 1.

The output interface 210 comprises at least one of registers, gates, latches, hardware components, and/or discrete components that output the VWQE 120 workflow results. For example, in an exemplary embodiment, the processor 202 controls the output interface 210 to output WQE's stored in the aggregation table 218 as the VWQE 120 workflow results.

During operation, WQE's 116 received by the network interface 212 are processed by the processor 202. In an embodiment, for each received WQE, the key portion is used to search the SRAM. If the key portion matches a stored key, then the WQE is stored in an aggregation queue identified by the stored key. The aggregation queue is located in the aggregation table 218. If the key portion does not match a key stored in the SRAM, then the key portion is hashed to obtain an address. The address is used to access the SRAM tables to find an empty location. When an empty location is found, the key is stored in the empty location along with an aggregation queue identifier and a time stamp. If no empty locations are found, the address of the SRAM table having the oldest key is used to store the new key and the oldest key is deleted. The aggregation queue associated with the oldest key is closed or terminated and the WQE's in the closed aggregation queue are combined to form a VWQE that is output from the output interface 210. As additional keys are processed, the queues of the aggregation table 218 fill up and the processor 202 extracts the WQE's from full aggregation queues to form workflow vectors that are output by the output interface 210 as the VWQE 120. A more detailed description of the design and operation of the workflow processor 200 is provided below.

Figure 3:
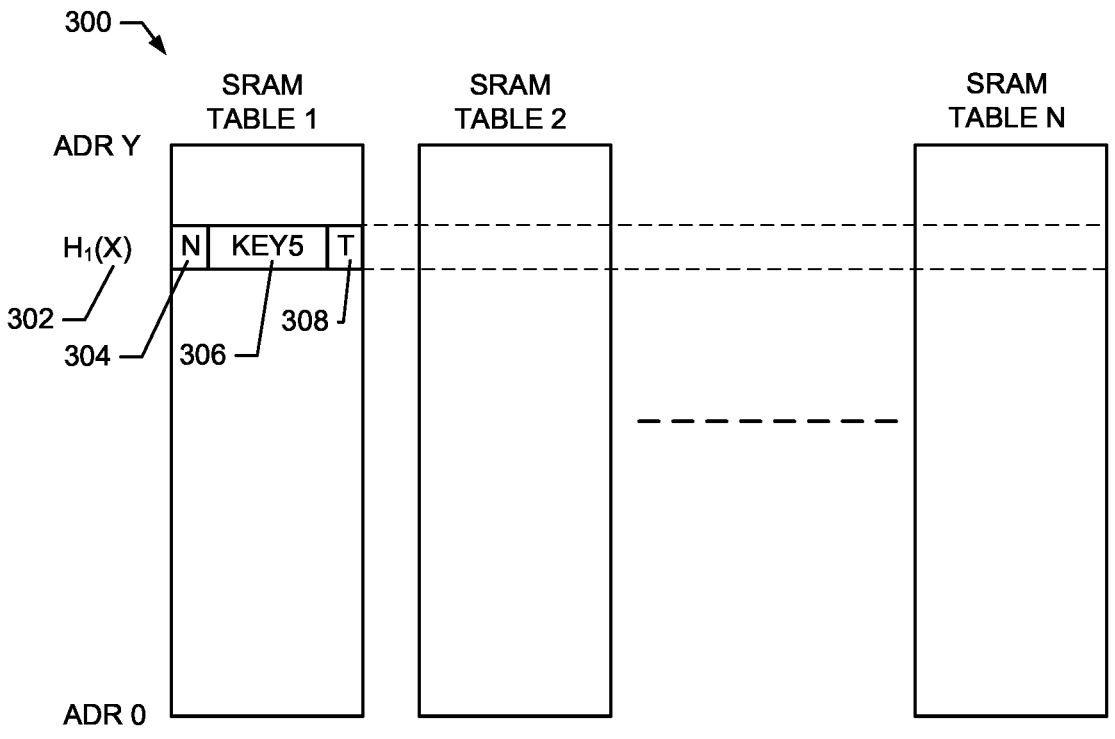
FIG. 3 shows exemplary embodiments SRAM and aggregation tables for use with the workflow processor shown in FIG. 2.

FIG. 3 shows exemplary embodiments of SRAM and aggregation tables for use with the workflow processor shown in FIG. 2. As illustrated in FIG. 3, the SRAM memory 206 is divided into "N" SRAM tables 300. In an embodiment, N is any integer value, for instance, in one embodiment, the value of N is four. Table addresses (0-Y) are used to access the tables at the same time, or each table can be individually accessed. For example, in an embodiment, the table address range is 0-256, which can be addressed using an 8-bit address. In an embodiment, a received key is processed by a hash algorithm to produce a hashed address that is used to access the tables. For example, the hashed address HI (x) 302 is used to access corresponding locations in all N tables. For each table, the entry stored at the location accessed by the hashed address includes an aggregation queue number (N) 304, a key 306, and a timestamp (T) 308.

During operation, entries in the tables of the SRAM are updated as additional keys are received. A count 310 is maintained to indicate the number of WQE entries in each aggregation queue. For example, as shown at aggregation table 218, the count 310 a count is stored with each queue in the aggregation table 218. When the count for a particular queue reaches a certain level, the WQE entries are aggregated into a vector (VWQE) and output. The queue is then cleared and ready to accept more entries. For example, five WQE entries are stored in the aggregation table 218 at queue number 1 and the count 310 shows a value of 5. When an aggregation queue is filled, the processor 202 aggregates the WQE entries of that queue and forms them into a vector (VWQE) that is transmitted to a downstream processing system.

Figure 4:
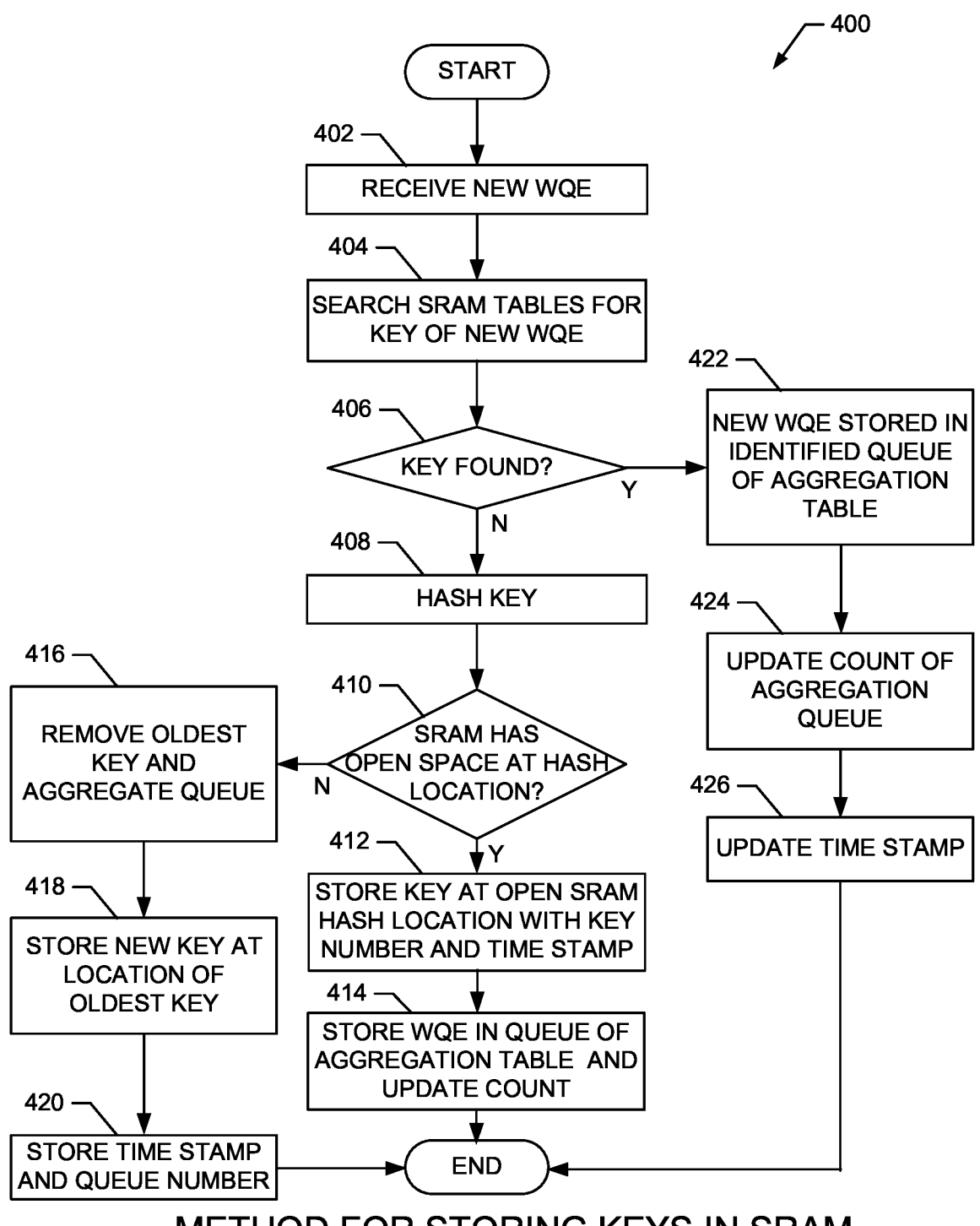
FIG. 4 shows an exemplary method for storing workflow keys performed by an embodiment of a workflow processor.

FIG. 4 shows an exemplary method 400 for storing workflow keys as performed by embodiments of a workflow processor. For example, method 400 is performed by embodiments of the workflow processor 108 or the workflow processor 200.

At block 402, a new WQE is received. For example, the new WQE is transmitted by a client over the communication network 104 and received by the network interface 212. The received WQE is then passed to the processor 202 for processing.

At block 404, tables in the SRAM are searched for the key that is part of the new WQE. In an embodiment, the processor 202 searches the contents of the tables in the SRAM 206 for the key of the new WQE.

At block 406, a determination is made as to whether the key was found in the tables of the SRAM. For example, the processor 202 makes this determination by comparing the contents of each SRAM table entry with the key. If the key is found in the tables of the SRAM 206, the method proceeds to block 422. If the key is not found in the tables of the SRAM 206, the method proceeds to block 408.

At block 408, a hash function is performed on the key to obtain a hash value that represents an address. For example, the processor 202 performs the hash algorithm 218 to hash the key to obtain the hash value. The hash value represents a hashed address that will be used to access the tables of the SRAM 206.

At block 410, a determination is made as to whether there is an open location in the tables of the SRAM at the hashed address. For example, the processor 202 evaluates the contents of the tables in the SRAM at the hashed address to determine if there is an open or unused location. Each of the "N" SRAM tables is checked. If there is an unused location at the hashed address the method proceeds to block 412. If there is not an open location in any of the tables of the SRAM at the hashed address, the method proceeds to block 414.

At block 412, the key is stored at open location in the tables of the SRAM at the hashed address. In addition to the key, an aggregation queue number and timestamp are also stored with the key in the table of the SRAM. In an embodiment, the processor 202 identifies a queue in the aggregation table to be used for WQE's having this key.

At block 414, the received WQE is stored in the identified aggregation queue. For example, the processor 202 stores the received WQE in the aggregation queue that corresponds to the queue identifier. The processor 202 also increments the count 310 that indicates the number of WQE's in the aggregation queue.

At block 416, the oldest key stored in the tables of the SRAM at the hashed address is removed and the WQE's in the corresponding queue in the aggregation table are aggregated into a VWQE and output. For example, the processor 202 determines the oldest key stored in the tables of the SRAM at the hashed address by reading and comparing the associated timestamps 308. The processor also obtains the aggregation queue number 304 of the oldest key from the tables of the SRAM. The processor 202 then deletes this oldest key and associated entries in the SRAM and aggregates the WQE entries in the corresponding aggregation queue number to form a VWQE that is output.

At block 418, the new key is stored in the tables of the SRAM at the hashed address and location that the oldest key was found. For example, the processor 202 stores the new key to replace the oldest key in the tables of the SRAM.

At block 420, in addition to storing the new key at the location of the oldest key, the processor 202 stores a new queue number and timestamp for the new key.

At block 422, after finding a key in the tables of the SRAM that matches the new key, the received WQE is stored in the aggregation queue associated with the found key. For example, the processor 202 reads the found key from the tables of the SRAM in addition to its associated aggregation queue number and timestamp. The processor 202 then stores the new WQE in the identified queue of the aggregation table.

At block 424, the count of the aggregation queue is updated to reflect that a new WQE has been added to the aggregation queue. For example, the processor 202 updates the count associated with the aggregation queue in which the new WQE is stored.

At block 426, the timestamp of the key in the tables of the SRAM is updated. For example, the processor 202 updates the timestamp 308 of the key found in the SRAM tables to reflect the timestamp of the newly received WQE.

Thus, the method 400 operates to store workflow keys received by a workflow processor. It should be noted that the operations of method 400 are exemplary and not limiting and that the operations can be added to, deleted, updated, rearranged, or otherwise modified within the scope of the embodiments.

Figure 5:
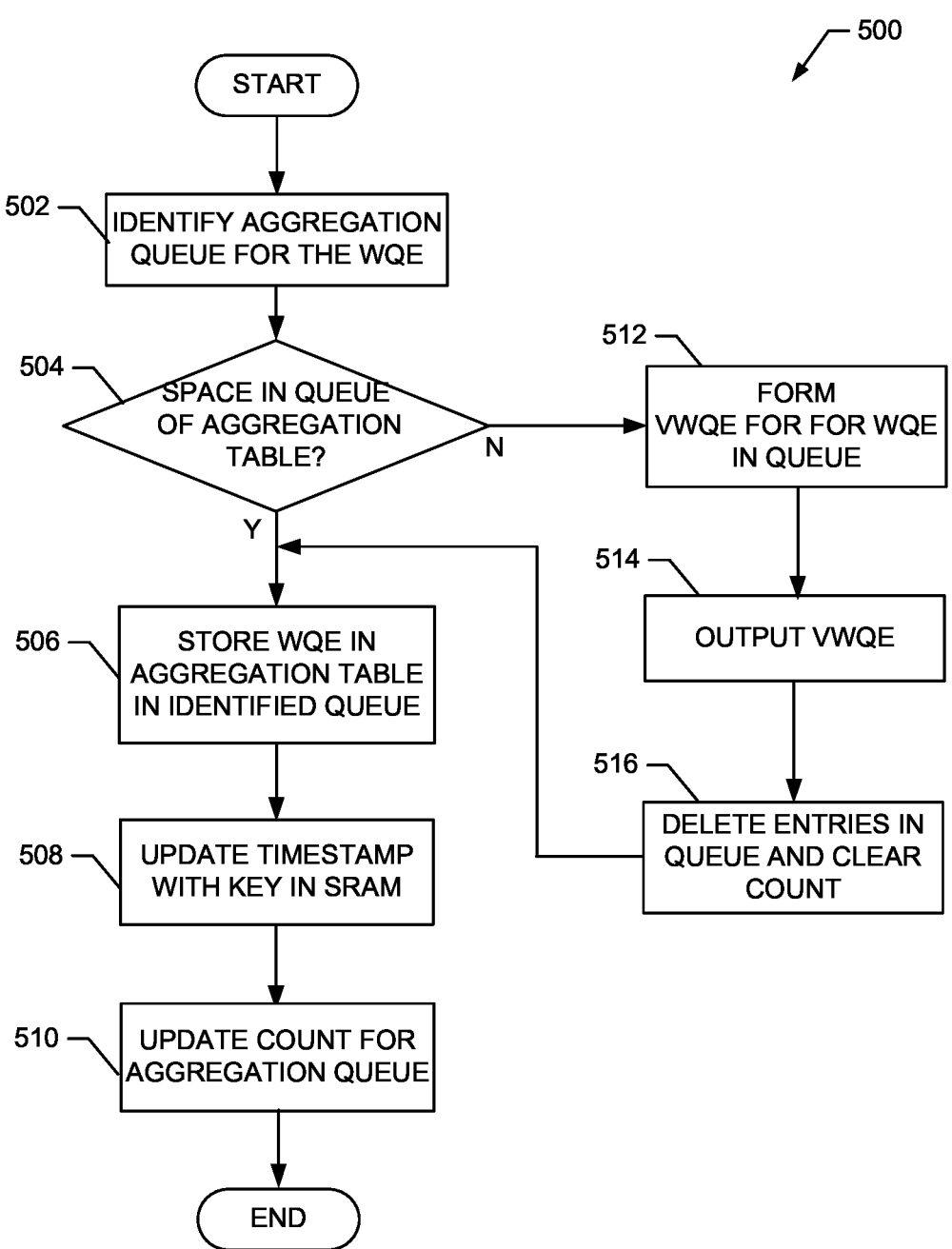
FIG. 5 shows an exemplary method for storing workflow keys performed by an embodiment of a workflow processor.

FIG. 5 shows an exemplary method 500 for storing received WQE's in an aggregation table. For example, method 500 is performed by embodiments of the workflow processor 108 or the workflow processor 200.

At block 502, an aggregation queue for a received WQE is identified. In one embodiment, the tables of the SRAM are searched for the key associated with the WQE. If the key is found, the aggregation queue stored with the key is the aggregation queue to be used for the WQE. If the key is not found during the search, an empty aggregation queue is used for the WQE. In an embodiment, the processor 202 assigns the aggregation queue number to the WQE.

At block 504, a determination is made as to whether there is space in the assigned queue of the aggregation table to store the WQE. For example, the assigned queue in the aggregation table may be full. The processor 202 makes this determination. If there is space in the assigned queue for the WQE, the method proceeds to block 506. If there is not space in the assigned queue for the WQE, the method proceeds to block 512.

At block 506, the WQE is stored in the assigned queue in the aggregation table. For example, the processor 202 stores the received WQE in the assigned queue of the aggregation table.

At block 508, a timestamp stored with the key in the table of the SRAM is updated with the timestamp of the new WQE. For example, the processor 202 updates the timestamp 308 in the table of the SRAM with the timestamp associated with the received WQE.

At block 510, a count stored with the queue of the aggregation table is updated with the entry of the WQE into the queue. For example, the processor 202 updates the count 310 associated with the queue in the aggregation table to reflect that a new WQE has been stored in the queue.

At block 512, a vector of WQE entries from the aggregation queue is formed. For example, the processor 202 aggregates the WQE entries from the assigned queue in the aggregation table to form a VWQE.

At block 514, the vector VWQE is output. For example, the processor 202 outputs the VWQE to downstream processing system using the output interface 210.

At block 516, entries in the assigned queue of the aggregation table are deleted and the count is cleared. For example, the processor 202 performs this function.

Thus, the method 500 operates to store workflow WQE's received by a workflow processor into an aggregation table. It should be noted that the operations of method 500 are exemplary and not limiting and that the operations can be added to, deleted, updated, rearranged, or otherwise modified within the scope of the embodiments.

Figure 6:
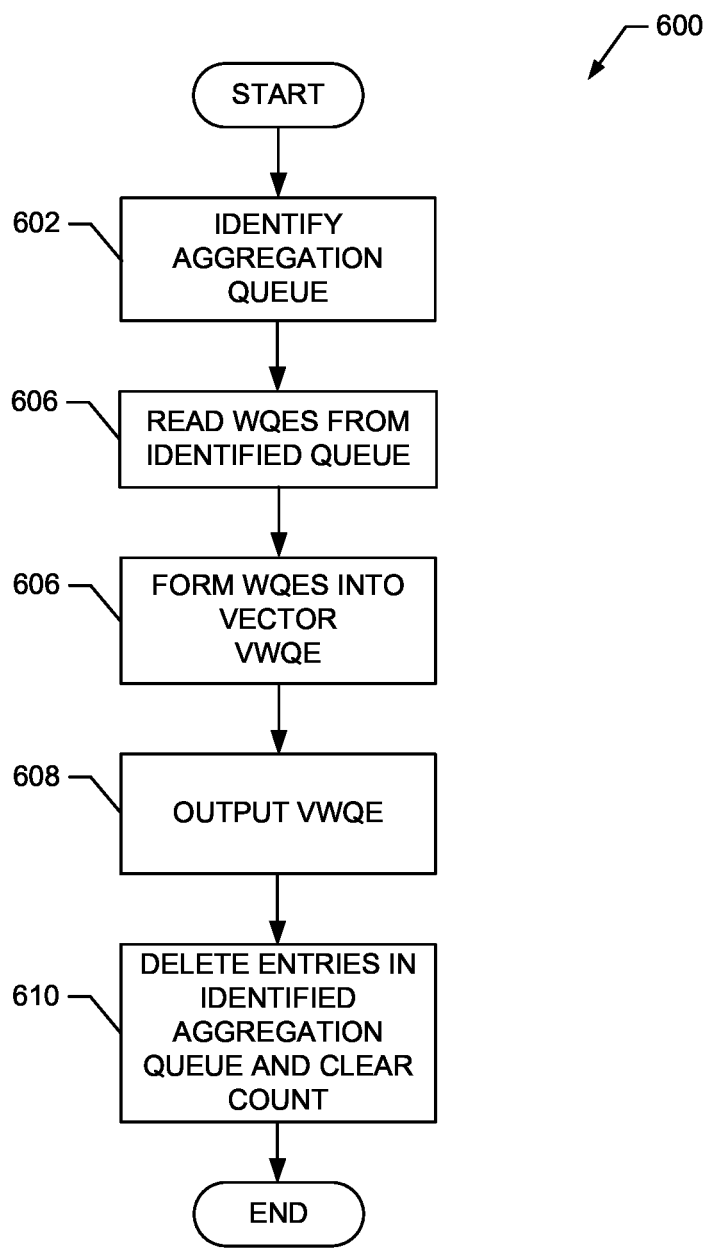
FIG. 6 shows an exemplary method for storing workflow keys performed by an embodiment of a workflow processor.

FIG. 6 shows an exemplary method 600 for forming a VWQE output from WQE's in an aggregation queue. For example, in an embodiment, the processor 202 reads WQE's stored in a queue of the aggregation table and forms a vector (VWQE) for output.

At block 602, an aggregation queue in the aggregation table is identified. For example, the processor 202 identifies the aggregation queue as being full or having entries that are getting to old.

At block 604, WQE's stored in the aggregation queue are read. For example, the processor 202 reads the WQE's from the identified aggregation queue.

At block 606, the WQE's that are read from the aggregation queue are aggregated to form a vector VWQE. For example, the processor 202 aggregates the WQE's read from the identified queue and aggregates these WQE's to form a vector VWQE.

At block 608, the vector VWQE is output. For example, the processor 202 outputs the VWQE from the output interface 210.

At block 610, the entries of WQE's stored in the aggregation queue are deleted and the associated count is cleared. For example, the processor 202 performs this function.

Thus, the method 600 operates to form a VWQE output from WQE's stored in an aggregation queue. It should be noted that the operations of method 600 are exemplary and not limiting and that the operations can be added to, deleted, updated, rearranged, or otherwise modified within the scope of the embodiments.

Figure 7:
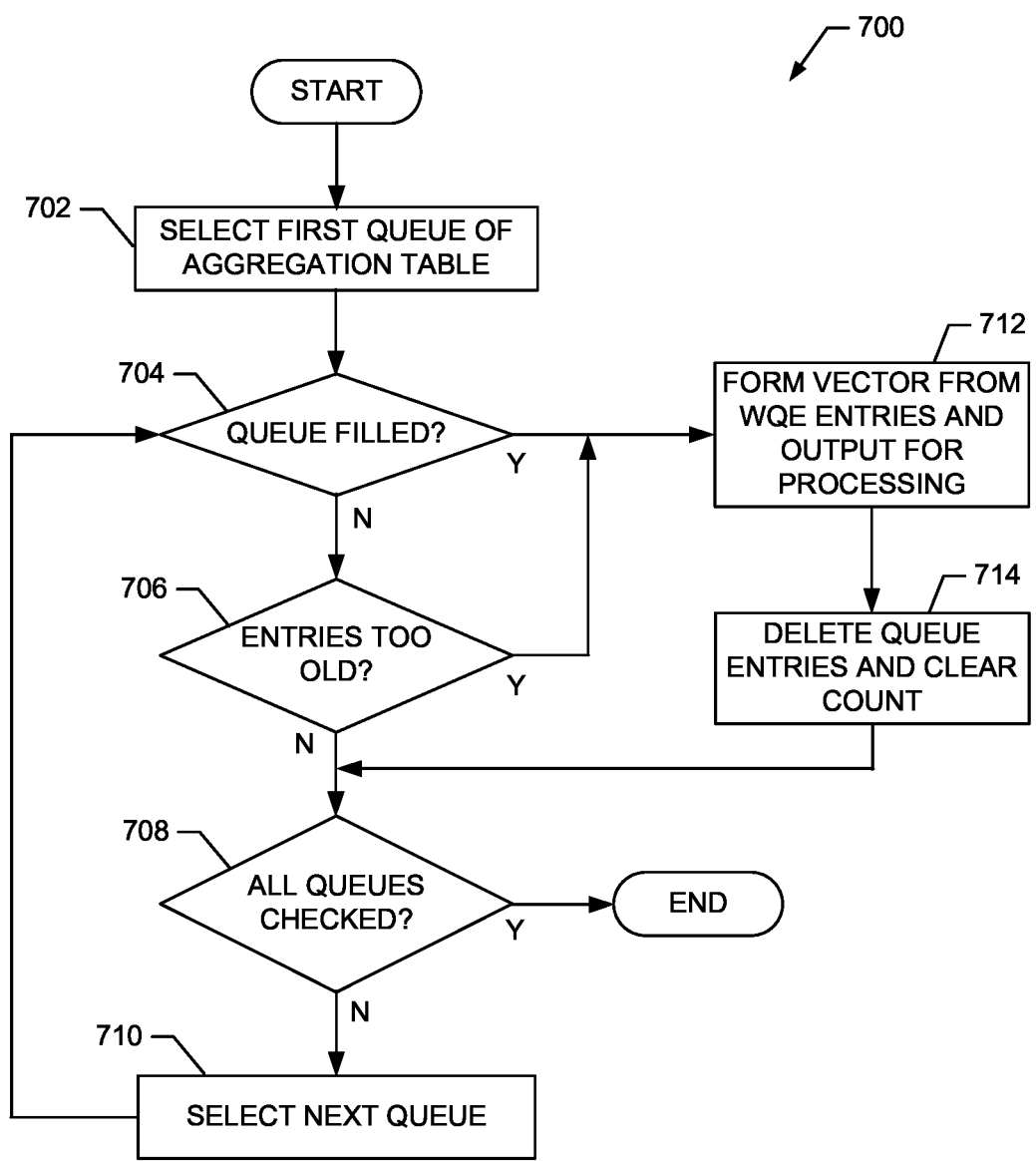
FIG. 7 shows an exemplary method for scrubbing an aggregation table performed by an embodiment of a workflow processor.

FIG. 7 shows an exemplary method 700 for scrubbing an aggregation table. For example, method 700 is performed by embodiments of the workflow processor 108 or the workflow processor 200.

At block 702, a first queue of an aggregation table is selected.

At block 704, determination is made as to whether the queue is filled. For example, the processor 202 makes this determination by checking the value of the associated count 310. If the queue is not filled, the method proceeds to block 706. If the queue is filled or at a selected number of entries, the method proceeds to block 712.

At block 706, a determination is made as to whether the entries are too old. For example, the processor 202 makes this determination by checking the timestamp of the queue's corresponding key stored in tables of the SRAM. If the entries in the queue are not too old, the method proceeds to block 708. If the entries in the queue are too old, the method proceeds to block 712.

At block 708, a determination is made as to whether all queues have been checked. The processor 202 makes this determination. If all the queues have been checked, the method ends. If all the queues have not been checked, the method proceeds to block 710.

At block 710, the next queue in the aggregation table is selected. For example, the processor 202 selects the next queue in the aggregation table to scrub.

At block 712, a vector of WQE (VWQE) is formed from the entries in the selected queue. For example, the processor 202 forms the VWQE from the WQE entries stored in the selected queue. The processor 202 then outputs the VWQE using the output interface 210.

At block 714, the WQE entries in the selected queue are deleted and the count associated with the queue is cleared. For example, the processor 202 performs this operation.

Thus, the method 700 operates to scrub an aggregation table. It should be noted that the operations of method 700 are exemplary and not limiting and that the operations can be added to, deleted, updated, rearranged, or otherwise modified within the scope of the embodiments.

Figure 8:
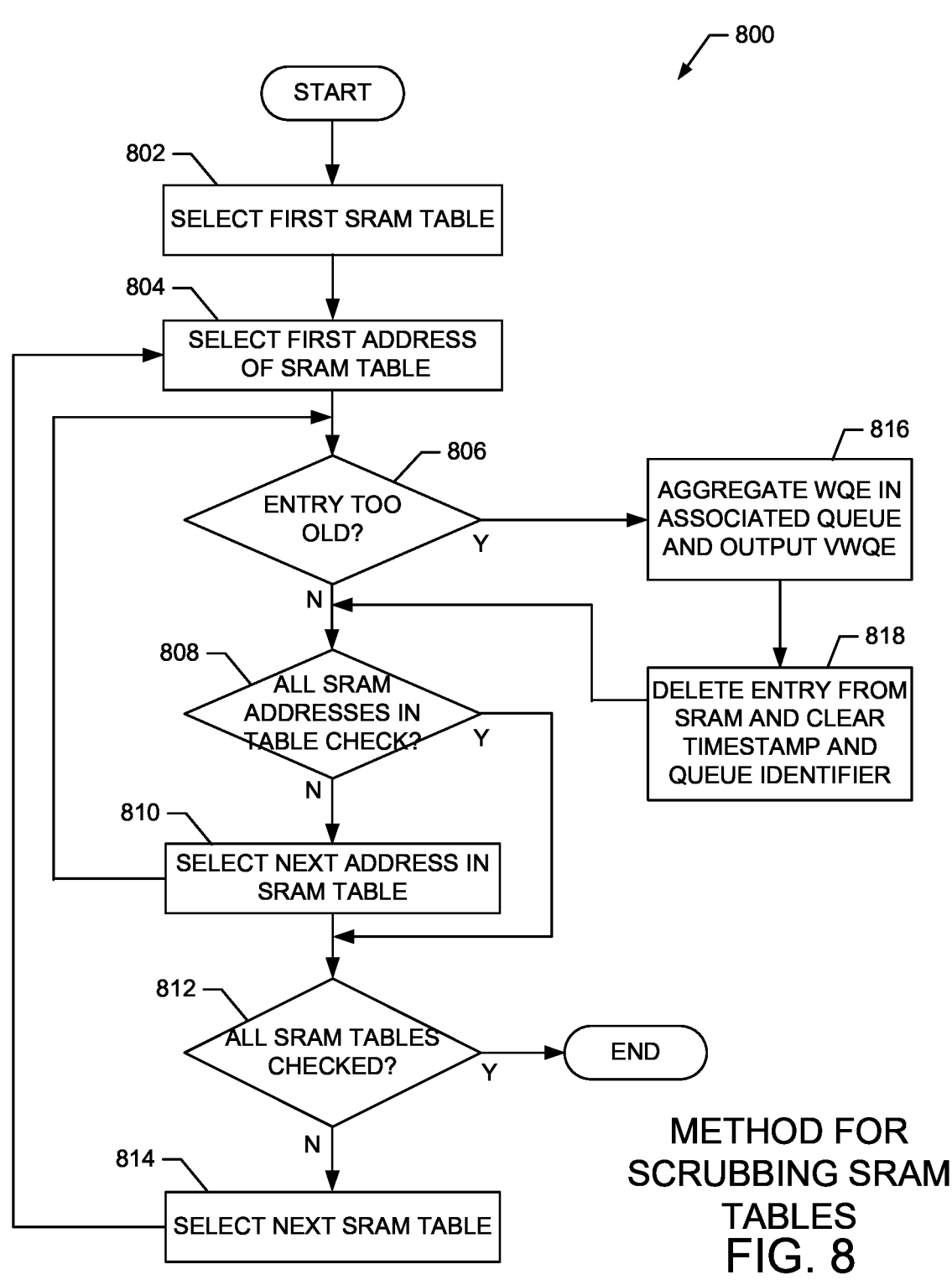
FIG. 8 shows an exemplary method for scrubbing SRAM performed by an embodiment of a workflow processor.

FIG. 8 shows an exemplary method for scrubbing SRAM tables. For example, method 800 is performed by embodiments of the workflow processor 108 or the workflow processor 200.

At block 802, a first SRAM table is selected. For example, the processor 202 selects the first SRAM table for scrubbing.

At block 804, a first address of the selected SRAM table is selected. For example, the processor 202 selects the first address of the selected SRAM table.

At block 806, the determination is made as to whether the entry in the SRAM address is too old. For example, if the address includes a key value, the timestamp associated with the key value is checked to determine if the entry is too old. The processor 202 performs this operation. If the key value is too old, the method proceeds to block 816. If the key value is not too old, the method proceeds to block 808.

At block 808, a determination is made as to whether all SRAM addresses in the selected SRAM table have been checked. The processor 202 makes this determination. If all the addresses in the selected SRAM table have been checked, the method proceeds to block 812. If all the addresses have not been checked, the method proceeds to block 810.

At block 810, the next address in the SRAM table is selected. The processor 202 performs this operation.

At block 812, a determination is made as to whether all SRAM tables have been checked. The processor 202 performs this operation. If all SRAM tables have been checked, the method ends. If all SRAM tables have not been checked, the method proceeds to block 814.

At block 814, the next SRAM table is selected. The processor 202 performs this operation.

At block 816, the WQE entries in the queue of the aggregation table that is associated with the SRAM entry is aggregated to form a VWQE that is output. The processor 202 performs this operation. moved to the aggregation table At block 818, the entry is deleted from the SRAM at the selected address and the timestamp and queue identifier are also deleted.

Thus, the method 800 operates to scrub SRAM tables. It should be noted that the operations of method 800 are exemplary and not limiting and that the operations can be added to, deleted, updated, rearranged, or otherwise modified within the scope of the embodiments.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method, comprising:
   receiving a workflow queue entry (WQE) that includes a key value;
   searching a plurality of memory tables for an address that contains the key value;
   when the address that contains the key value is found, obtaining a first queue identifier from the address;
   when the address that contains the key value is not found, storing the key value and a second queue identifier at a selected address in a selected memory table;
   storing the WQE in an aggregation queue identified by one of the first and second queue identifiers;
   updating a count associated with the aggregation queue;
   when the count reached a selected level, aggregating all WQE entries in the aggregation queue to form a WQE vector (VWQE);
   accessing the selected address at all memory tables to obtain respective memory content;
   comparing the respective memory content to determine an oldest memory content;
   identifying one memory table that has the oldest memory content as the selected memory table;
   obtaining an old queue identifier stored with the oldest memory content;
   aggregating all WQE entries in an aggregation queue identified by the old queue identifier to form an old WQE vector (VWQE); and outputting the old VWQE to a downstream processing system.

2. The method of claim 1, wherein the plurality of memory tables comprise "N" memory tables formed in an SRAM memory.

3. The method of claim 2, wherein the N memory tables comprise four memory tables.

4. The method of claim 1, further comprising updating a timestamp stored with the key value.

5. The method of claim 1, further comprising hashing the key value using a cuckoo hashing algorithm to generate 8-bits that forms the selected address.

6. The method of claim 1, wherein the operation of aggregating all WQE entries further comprises clearing the count.

7. The method of claim 1, further comprising receiving the WQE in a transmission from a client over a communication network.

8. The method of claim 1, further comprising outputting the VWQE to a downstream processing system.

9. An apparatus, comprising:
   an interface configured to receive a workflow queue entry (WQE) that includes a key value;
   a plurality of memory tables;
   an aggregation table having one or more aggregation queues; and
   a processor configures to perform operations of:
      searching the plurality of memory tables for an address that contains the key value;
      when the address that contains the key value is found, obtaining a first queue identifier from the address;
      when the address that contains the key value is not found, storing the key value and a second queue identifier at a selected address in a selected memory table;
      storing the WQE in an aggregation queue identified by one of the first and second queue identifiers;
      updating a count associated with the aggregation queue; and
      when the count reached a selected level, aggregating all WQE entries in the aggregation queue to form a WQE vector (VWQE);
   accessing the selected address at all memory tables to obtain respective memory content;
   comparing the respective memory content to determine an oldest memory content;
   identifying one memory table that has the oldest memory content as the selected memory table;
   obtaining an old queue identifier stored with the oldest memory content;
   aggregating all WQE entries in an aggregation queue identified by the old queue identifier to form an old WQE vector (VWQE); and
   outputting the old VWQE to a downstream processing system.

10. The apparatus of claim 9, wherein the plurality of memory tables comprise "N" memory tables formed in an SRAM memory.

11. The apparatus of claim 10, wherein the N memory tables comprise four memory tables.

12. The apparatus of claim 9, wherein the processor updates a timestamp stored with the key value.

13. The apparatus of claim 9, wherein the processor performs a cuckoo hashing algorithm to hash the key value to generate 8-bits that forms the selected address.

14. The apparatus of claim 9, wherein the operation of aggregating all WQE entries further comprises clearing the count.

15. The apparatus of claim 9, wherein the interface receives the WQE in a transmission from a client over a communication network.

16. The apparatus of claim 9, further comprising an output interface that outputs the VWQE to a downstream processing system.

17. A hardware description language (HDL) design structure encoded on a machine-readable data storage medium, the HDL design structure comprising elements that when processed in a computer-aided design system generates a machine-executable representation for data transmission via a communication network, wherein the HDL design structure comprises:

an interface configured to receive a workflow queue entry (WQE) that includes a key value;

a plurality of memory tables;

an aggregation table having one or more aggregation queues; and a processor configures to perform operations of:

searching the plurality of memory tables for an address that contains the key value;

when the address that contains the key value is found, obtaining a first queue identifier from the address;

when the address that contains the key value is not found, storing the key value and a second queue identifier at a selected address in a selected memory table;

storing the WQE in an aggregation queue identified by one of the first and second queue identifiers;

updating a count associated with the aggregation queue;

when the count reached a selected level, aggregating all WQE entries in the aggregation queue to form a WQE vector (VWQE);

accessing the selected address at all memory tables to obtain respective memory content;

comparing the respective memory content to determine an oldest memory content;

identifying one memory table that has the oldest memory content as the selected memory table;

obtaining an old queue identifier stored with the oldest memory content;

aggregating all WQE entries in an aggregation queue identified by the old queue identifier to form an old WQE vector (VWQE); and outputting the old VWQE to a downstream processing system.

18. The HDL design structure of claim 17, wherein the plurality of memory tables comprise "N" memory tables formed in an SRAM memory.

19. The HDL design structure of claim 18, wherein the N memory tables comprise four memory tables.

20. The HDL design structure of claim 17, wherein the processor updates a timestamp stored with the key value.

21. The HDL design structure of claim 17, wherein the processor performs a cuckoo hashing algorithm to hash the key value to generate 8-bits that forms the selected address.

\* \* \* \* \*